United States Patent
Nagai et al.

(10) Patent No.: US 10,803,762 B2
(45) Date of Patent: Oct. 13, 2020

(54) BODY-MOTION ASSESSMENT DEVICE, DANCE ASSESSMENT DEVICE, KARAOKE DEVICE, AND GAME DEVICE

(71) Applicant: NEC Solution Innovators, Ltd., Koto-ku, Tokyo (JP)

(72) Inventors: Katsuyuki Nagai, Tokyo (JP); Koji Morishita, Tokyo (JP); Hisashi Noda, Tokyo (JP)

(73) Assignee: NEC SOLUTION INNOVATORS, LTD, Tokyo (JP)

( * ) Notice: Subject to any disclaimer, the term of this patent is extended or adjusted under 35 U.S.C. 154(b) by 281 days.

(21) Appl. No.: 14/781,641

(22) PCT Filed: Feb. 18, 2014

(86) PCT No.: PCT/JP2014/053782
§ 371 (c)(1),
(2) Date: Oct. 1, 2015

(87) PCT Pub. No.: WO2014/162787
PCT Pub. Date: Oct. 9, 2014

(65) Prior Publication Data
US 2016/0042652 A1    Feb. 11, 2016

(30) Foreign Application Priority Data
Apr. 2, 2013    (JP) .................... 2013-077144

(51) Int. Cl.
*G09B 19/00*    (2006.01)
*G09B 5/06*    (2006.01)
(Continued)

(52) U.S. Cl.
CPC .............. *G09B 5/06* (2013.01); *A63F 13/213* (2014.09); *A63F 13/42* (2014.09); *A63F 13/44* (2014.09);
(Continued)

(58) Field of Classification Search
CPC .. G09B 19/003; G09B 19/0038; A61B 5/103; G06F 3/011
(Continued)

(56) References Cited

U.S. PATENT DOCUMENTS

2005/0153265 A1* 7/2005 Kavana .............. G09B 19/0015
434/250
2010/0306712 A1* 12/2010 Snook ..................... G06F 3/017
715/863
(Continued)

FOREIGN PATENT DOCUMENTS

CN    101470898 A    7/2009
CN    102917640 A    2/2013
(Continued)

OTHER PUBLICATIONS

Chinese Office Action for CN Application No. 201480017637.X dated Oct. 8, 2016 with English Translation.
(Continued)

*Primary Examiner* — Peter R Egloff

(57) ABSTRACT

The present invention is intended to provide a body motion grading system that allows the grading less likely to be affected by the difference among the builds of target persons subjected to grading. The present invention provides body motion grading system (1) including body position information acquisition unit (11) configured to acquire body position information of a target person subjected to grading in time series, body part recognition unit (12) configured to recognize a position of each part in the acquired body position information in time series and relatively recognize positions of body parts with reference to a certain body part, body motion grading unit (13) configured to conduct grading by comparing a position of a body part recognized by the body part recognition unit with a preliminarily prepared (Continued)

1. Body motion grading system
11. Body position information acquisition unit
12. Body part recognition unit
13. Body motion grading unit
14. Grading result display unit
15. Condition data generation unit comparison condition in time series, and grading result display unit (14) configured to display a grading result.

5 Claims, 7 Drawing Sheets

(51) Int. Cl.
*A63F 13/213* (2014.01)
*A63F 13/814* (2014.01)
*A63F 13/42* (2014.01)
*A63F 13/44* (2014.01)
*A63F 13/46* (2014.01)
*G06F 3/01* (2006.01)

(52) U.S. Cl.
CPC ............ *A63F 13/46* (2014.09); *A63F 13/814* (2014.09); *G06F 3/011* (2013.01); *G09B 19/0015* (2013.01); *G09B 19/0038* (2013.01)

(58) Field of Classification Search
USPC ...................................... 434/307 A
See application file for complete search history.

(56) References Cited

U.S. PATENT DOCUMENTS

| | | | | |
|---|---|---|---|---|
| 2011/0275045 A1* | 11/2011 | Bhupathi | ............ | G09B 19/003 434/247 |
| 2012/0142436 A1 | 6/2012 | Sato | | |
| 2012/0183940 A1* | 7/2012 | Aragones | ............ | G06F 19/3437 434/247 |
| 2012/0214594 A1 | 8/2012 | Kirovski et al. | | |
| 2012/0308140 A1* | 12/2012 | Ambrus | ............ | G06K 9/00362 382/190 |
| 2013/0090574 A1 | 4/2013 | Kuribayashi et al. | | |
| 2013/0095924 A1* | 4/2013 | Geisner | ............ | G09B 19/0038 463/32 |

FOREIGN PATENT DOCUMENTS

| | | |
|---|---|---|
| JP | H10-207347 A | 8/1998 |
| JP | 3452783 B2 | 8/1999 |
| JP | 2009-213782 A | 9/2009 |
| JP | 2010-253322 A | 11/2010 |
| JP | 2011-062352 A | 3/2011 |
| JP | 2012-115539 A | 6/2012 |
| JP | 2013-116311 A | 6/2013 |
| WO | 2012/039467 A1 | 3/2012 |

OTHER PUBLICATIONS

International Search Report for PCT Application No. PCT/JP2014/053782, dated May 20, 2014.

* cited by examiner

1. Body motion grading system
11. Body position information acquisition unit
12. Body part recognition unit
13. Body motion grading unit
14. Grading result display unit
15. Condition data generation unit

| Line number | Body part | Tracking accuracy | x | y | z |
|---|---|---|---|---|---|
| 10 | SHOULDER_RIGHT | 2 | −0.12 | 0.20 | 2.60 |
| 11 | ELBOW_RIGHT | 2 | −0.06 | −0.07 | 2.54 |
| 12 | WRIST_RIGHT | 2 | −0.05 | −0.27 | 2.46 |
| 13 | HAND_RIGHT | 2 | −0.04 | −0.34 | 2.41 |
| 14 | HIP_LEFT | 2 | −0.34 | −0.16 | 2.48 |
| 15 | KNEE_LEFT | 2 | −0.38 | −0.61 | 2.46 |
| 16 | ANKLE_LEFT | 2 | −0.37 | 0.94 | 2.47 |
| 17 | FOOT_LEFT | 2 | −0.36 | −0.98 | 2.39 |
| 18 | HIP_RIGHT | 2 | −0.18 | −0.16 | 2.50 |
| 19 | KNEE_RIGHT | 2 | −0.19 | −0.61 | 2.46 |
| 20 | ANKLE_RIGHT | 2 | −0.19 | −0.94 | 2.46 |

FIG. 3

| Line number | Assessment timing (millisecond) | Comparison source body part ID | Past history of comparison target body part | Comparison target body part ID | Comparison axis | Size comparison | Score |
|---|---|---|---|---|---|---|---|
| 10 | 5414 | 15 | 0 | 4 | x | −1 | 100 |
| 11 | 6381 | 2 | 0 | 6 | y | 1 | 100 |
| 12 | 6381 | 2 | 0 | 10 | y | 1 | 100 |
| 13 | 6381 | 19 | 0 | 8 | x | −1 | 100 |
| 14 | 7504 | 11 | 0 | 9 | x | 1 | 100 |
| 15 | 7504 | 19 | 0 | 8 | x | 1 | 100 |
| 16 | 8425 | 7 | 0 | 5 | x | −1 | 100 |
| 17 | 8425 | 15 | 0 | 4 | x | 1 | 100 |
| 18 | 9470 | 11 | 0 | 9 | x | 1 | 100 |
| 19 | 9470 | 15 | 0 | 4 | x | −1 | 100 |
| 20 | 10453 | 7 | 0 | 5 | x | −1 | 100 |

FIG. 5

BODY-MOTION ASSESSMENT DEVICE, DANCE ASSESSMENT DEVICE, KARAOKE DEVICE, AND GAME DEVICE

This application is a National Stage Entry of PCT/JP2014/053782 filed on Feb. 18, 2014, which claims priority from Japanese Patent Application 2013-077144 filed on Apr. 2, 2013, the contents of all of which are incorporated herein by reference, in their entirety.

TECHNICAL FIELD

The present invention relates to a body motion grading system, a dance grading device, a karaoke device, and a game device.

BACKGROUND ART

Among karaoke devices and the like, there is a karaoke device grading and evaluating singing skills in addition to simply allowing a user to sing a song to music. Furthermore, for making it more entertaining, proposed is a karaoke device having a function of grading dance choreography when a user dances following the dance choreography of the singer of the original song in addition to the grading evaluation of singing skills (Patent Document 1). The karaoke device of this type conducts grading on the basis of the motion of a certain body part by a vector comparison.

CITATION LIST

Patent Document(s)

Patent Document 1: Japanese Patent No. 3452783

SUMMARY OF INVENTION

Problem to be Solved by the Invention

However, there is a case that the motion cannot be judged by the vector comparison depending on the build or the like of a person who is subjected to grading (hereinafter referred to simply as "target person"). For example, in the case of the motion of the same distance, there is a possibility that the motion of a small person can be judged whereas the motion of a big person cannot be judged. Furthermore, the karaoke device according to Patent Document 1 is limited to the grading whether or not the motion is correct and does not allow the grading with reference to timing such as a sense of rhythm.

Hence, the first object of the present invention is to provide a body motion grading system that allows the grading less likely to be affected by the difference among the builds of target persons. The second object of the present invention is to provide a body motion grading system that allows the grading with reference to a sense of rhythm in addition to the grading with reference to correctness of motion.

Means for Solving Problem

In order to achieve the first object, the present invention provides a body motion grading system including: a body position information acquisition unit configured to acquire body position information of a target person subjected to grading in time series; a body part recognition unit configured to recognize a position of each part in the acquired body position information in time series and relatively recognize positions of body parts with reference to a certain body part; a body motion grading unit configured to conduct grading by comparing a position of a body part recognized by the body part recognition unit with a preliminarily prepared comparison condition in time series; and a grading result display unit configured to display a grading result.

In order to achieve the second object, the present invention provides a body motion grading system including: a body position information acquisition unit configured to acquire body position information of a target person subjected to grading in time series; a body part recognition unit configured to recognize a position of each part in the acquired body position information in time series; a body motion grading unit configured to conduct grading by comparing a position of a body part recognized by the body part recognition unit with a preliminarily prepared comparison condition in time series; and a grading result display unit configured to display a grading result, where in the body motion grading unit, specific grading timing and grading timing before and after the specific grading timing are set for the grading by comparison in time series, score candidates are obtained by weighting plural graded scores at each of the specific grading timing and the grading timing before and after the specific grading timing, and a score candidate is adopted from the plural score candidates as a score according to a predetermined criterion.

Effects of the Invention

The first body motion grading system of the present invention allows the grading less likely to be affected by the difference among the builds of target persons. The second body motion grading system of the present invention allows the grading with reference to a sense of rhythm in addition to the grading with reference to correctness of motion.

BRIEF DESCRIPTION OF DRAWINGS

FIG. 3 is a table showing an example of the dada of the body position information in the present invention.

FIG. 5 is a table showing an example of the condition data.

DESCRIPTION OF EXEMPLARY EMBODIMENT

Subject of the Present Invention

A subject of grading according to the present invention is not particularly limited. For example, the grading according to the present invention can be applied to various fields in which body motion is evaluated, i.e., the grading according to the present invention can be applied to those with choreography such as a dance and a play, those relating to the form of sports such as a swing of a golf and a batting of a baseball, and those used for an evaluation of the behavior of animals. Among them, the present invention is preferably applied to the choreography of the dance and the like.

(Configuration of Apparatus)

Figure 1:
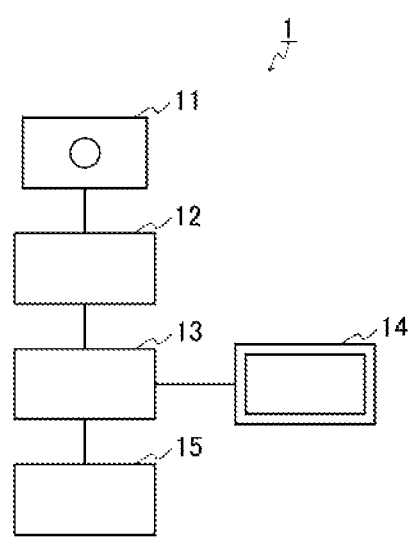
FIG. 1 is a block diagram showing an example of the configuration of the body motion grading system of the present invention.

As shown in the block diagram of FIG. 1, the body motion grading system 1 of this example includes body position information acquisition unit 11, body part recognition unit 12, body motion grading unit 13, and grading result display unit 14 as essential components and includes condition data generation unit 15 as an optional component. The present invention includes a first apparatus and a second apparatus. The first apparatus is characterized in that body motion is relatively grasped. The second apparatus is characterized in that timing such as a sense of rhythm can be assessed. Since both the apparatuses are able to combine their characteristics, the description below is applied to both the apparatuses.

(Body Position Information Acquisition Unit)

The body position information acquisition unit acquires body position information of a target person in time series. Examples of the body position information acquisition unit include cameras and sensors that acquire body position information as digital information.

(Body Part Recognition Unit)

Figure 2:
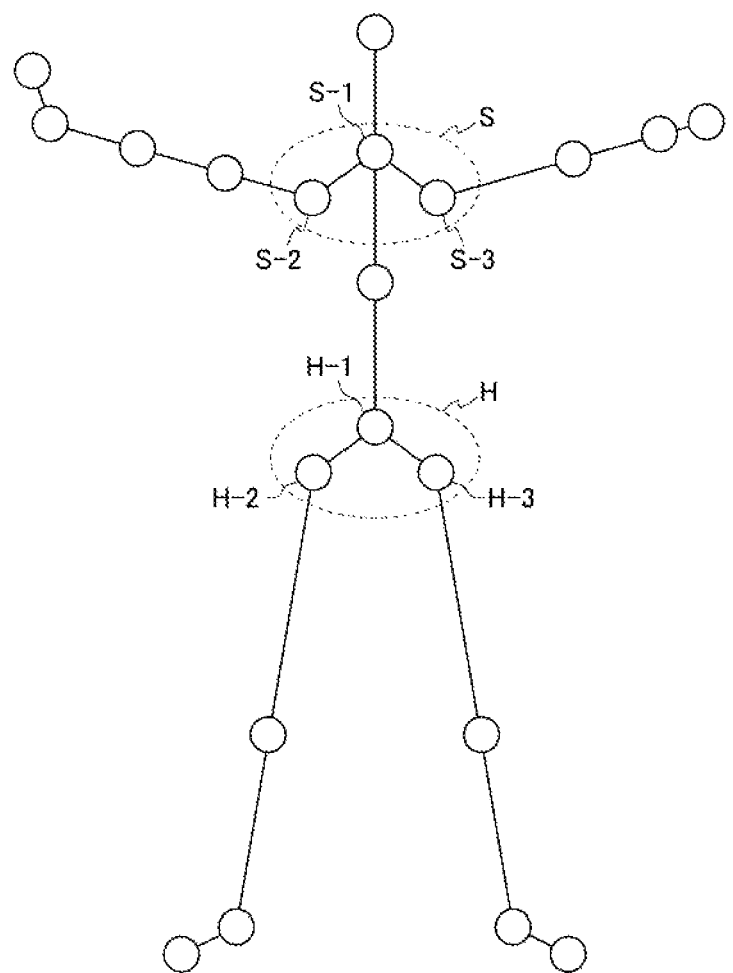
FIG. 2 is a diagram showing an example in which body parts are recognized after modeling.

The body part recognition unit recognizes a position of each part in the digital body position information acquired by the body position information acquisition unit in time series and relatively recognizes positions of body parts with reference to a certain body part. This allows the grading less likely to be affected by the difference among the builds of target persons. In the present invention, the idea of "relatively recognizing positions of body parts with reference to a certain body part" includes relative recognition of angles. The body part recognition unit may recognize the whole body without being treated or may recognize body parts after modeling, for example. FIG. 2 is a diagram showing an example in which body parts are recognized after modeling. In FIG. 2, body parts are classified into 21 segments and recognized. The body parts may be grouped and recognized as regions such that S-1, S-2, and S-3 indicate a shoulder S region and H-1, H-2, and H-3 indicate a hip H region. "Kinect" (product name, product of Microsoft) is an example of such unit configured to recognize body parts after modeling. FIG. 3 shows an example of position data of body parts after modeling. In FIG. 3, the body part, the tracking information, and the position information on X, Y, and Z coordinates of the modeled body position data are summarized for each line number. The tracking information is obtained by a sensor or a camera and indicates the certainty of the position information. For example, the position information can be processed on the basis of the certainty of the acquired body position information by classifying reliable information as "2" and estimated position information as "1".

(Body Motion Grading Unit)

The body motion grading unit conducts grading by comparing a position of a body part recognized by the body part recognition unit with a preliminarily prepared comparison condition in time series. In the body motion grading unit, the grading conducted by comparing a position of a body part recognized by the body part recognition unit with a preliminarily prepared comparison condition in time series is, for example, grading conducted by comparing condition data showing a positional relationship between a part of a preliminarily prepared model and another part of the preliminarily prepared model with the position of the body part recognized by the body part recognition unit. The condition data may include the angle between the line connecting part 1 and part 2 and the line connecting part 3 and part 4 as a condition. The grading on the basis of the relative position and the relative angle of the parts allows the grading less likely to be affected by the difference among the builds of target persons. The condition data includes scores that will be given when conditions are satisfied.

(Condition Data)

The position data of the condition data may be the comparison between the size of a specific part (for example, the center of the shoulder) at a certain time (millisecond) and the size of the same part at the past historical axes (X, Y, and Z), for example. The size comparison may be defined, for example, as follows: "−1" indicates a size smaller than the comparison source, "0" indicates a size identical to the comparison source, and "1" indicates a size larger than the comparison source. Besides, the position data of the condition data may be the comparison between the line connecting specific parts and the same line in the history, for example. In this case, for example, "1" may indicate that the two lines are parallel to each other and "2" may indicate that the two lines are perpendicular to each other. Then, by linking the position data of the condition data with a score, for example, a score is added when the data of the target person matches the position data. For example, the score may take a point system of adding points, e.g., 1 point, 10 points, and 100 points.

(Automatic Generation of Condition Data)

The condition data may be automatically generated by condition data generation unit 15 from a group of pairs of the body position data shown in FIG. 3 and the time when grading assessment should be made (hereinafter, referred to simply as "assessment timing"). The condition data generation unit 15 includes a specification unit configured to specify plural target points of a body and a recording unit configured to record a result obtained by comparison of a positional relationship between two points among the plural target points in association with a predetermined score as the condition data. The automatic generation of the condition data by condition data generation unit 15 is performed by the processing according to the flowchart shown in FIG. 4, for example.

(Flowchart of Condition Data Automatic Generation)

Figure 4:
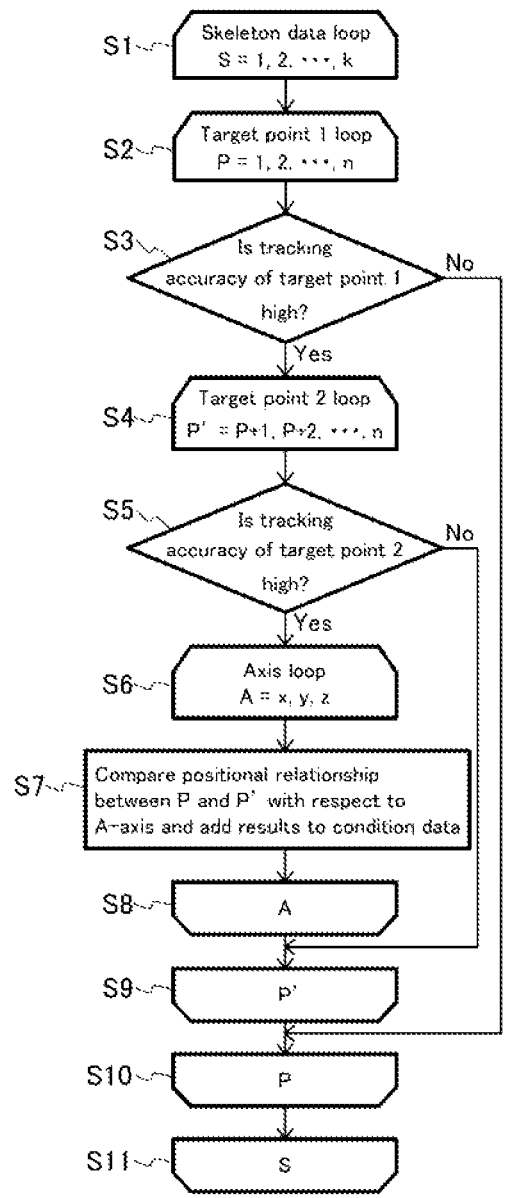
FIG. 4 is a flowchart showing an example of the generation method of condition data in the present invention.

In the flowchart shown in FIG. 4, the automatic generation of condition data in the case where three points, namely, the left hand (a), the center of the shoulder (b), and the right hand (c) are considered as target points is described. In this case, the comparison of the positional relationship between two points (here, three combinations, namely, a and b, a and c, and b and c) at the respective times of assessment timing (S=1, 2, . . . k, i.e., the number of times of assessment timing is k) of body position information data (referred to as "skeleton data" in FIG. 4) was performed to generate the condition data of the x-axis, the y-axis, and the z-axis.

(Skeleton Data Loop: S1–S11)

In skeleton data loop (S1–S11), the processing is repeated by the number of times of assessment timing (S=1, 2 . . . k).

(Target Point 1 Loop: S2–S10)

In target point 1 loop (S2–S10), in the case where the target point is expressed by the equation, P=1, 2 . . . n, since the target points are three, namely, a, b, and c in the above-described examination, n is 3 and 1, 2, 3 of P respectively correspond to a, b, and c.

(Assessment of Tracking Accuracy of Target Point 1: S3)

In the assessment of the tracking accuracy of target point 1 (S3), if the result is Yes, the procedure proceeds to target point 2 loop P'. On the other hand, if the result is No, the procedure skips P' and proceeds to the endpoint of P (S10) and returns to the target point 1 loop (S2).

(Target Point 2 Loop: S4-S9)

In target point 2 loop (S4-S9), since the P' is expressed by the equation, P'=P+1, P+2, . . . n, P' is 2 when P is 1. Thus the combination of a and b is to be compared.

(Assessment of Tracking Accuracy of Target Point 2: S5)

In the assessment of the tracking accuracy of target point 2 (S5), if the result is Yes, the procedure proceeds to axis loop A (S6). On the other hand, if the result is No, the procedure skips S6 and proceeds to the endpoint of P' (S9) and returns to the target point loop 2 (S4).

(Axis Loop: S6-S8)

In axis loop (S6-S8), the positional relationship between P and P' is compared with respect to three axes, namely, the x-axis, y-axis, and z-axis (larger than comparison source: 1, identical to comparison source: 0, and smaller than comparison source: −1) and the results are added to the condition data.

(Example of Condition Data)

FIG. 5 shows an example of the condition data automatically generated in this manner. In the condition data of FIG. 5, the assessment timing (millisecond), the comparison source body part ID, the past history of comparison target body part, the comparison target body part ID, the comparison axis, the size comparison, and the score are summarized for each line number. The past history of comparison target body part is to be used for showing the comparison target body part at assessment timing x times before the present timing, and 0 indicates the comparison between the comparison source body part and the comparison target body part at the same assessment timing. With respect to the size comparison, for example, "−1" indicates a size smaller than the comparison source, "0" indicates a size identical to the comparison source, and "1" indicates a size larger than the comparison source.

(Weighting Grading)

In the body motion grading unit, specific grading timing and grading timing before and after the specific grading timing are set for the grading by comparison in time series, score candidates are obtained by weighting plural graded scores at each of the specific grading timing and the grading timing before and after the specific grading timing, and a score candidate is adopted from the plural score candidates as a score according to a predetermined criterion. This allows the grading with reference to a sense of rhythm. A criterion for adopting a score candidate from the plural score candidates is to adopt the highest score candidate among the plural score candidates, for example.

(Flowchart of Weighting Grading)

Figure 6:
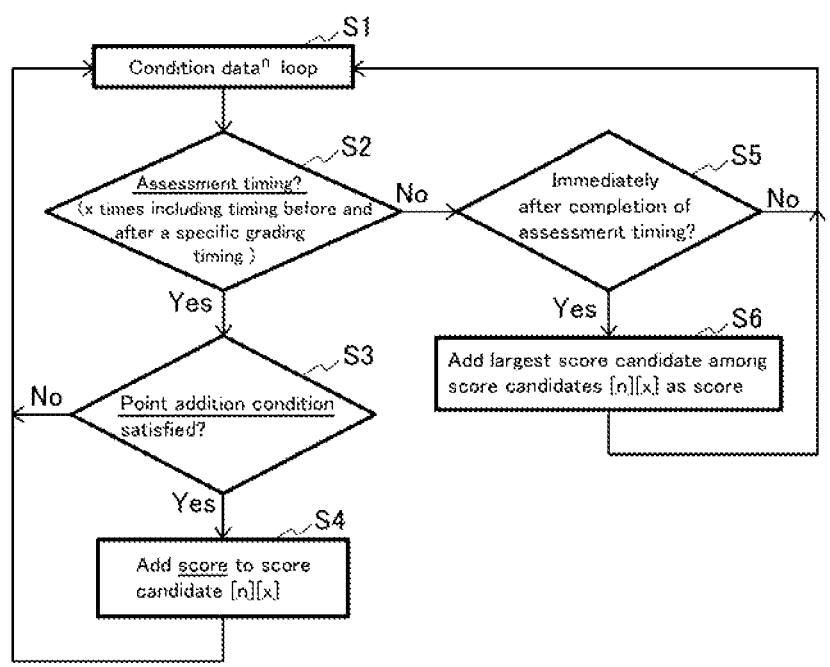
FIG. 6 is a flowchart showing an example of the grading method of the present invention.

FIG. 6 is a flowchart showing the processing of the grading that employs the above-described weighting. FIG. 6 shows the processing of grading at a given time and the processing is executed as time passes. There is no particular limitation on the cycle of the processing.

(Condition Data$^n$ Loop: S1)

In condition data$^n$ loop (S1), the processing is repeated with respect to n pieces of condition data (S=1, 2, . . . n).

(Determination of Assessment Timing: S2)

In the determination of assessment timing (S2), the assessment is made several times for allowing more latitude in the assessment timing. For example, if the assessment timing includes specific grading timing and two times of grading timing respectively before and after the specific grading timing, the assessment timing includes five times of timing in total (X=0, 1, 2, 3, and 4). Then, if the present time matches any of five times of assessment timing (Yes), the procedure proceeds to S3. On the other hand, if the present time does not match any of five times of assessment timing (No), the procedure proceeds to S5.

(Determination of Point Addition Condition: S3)

In the determination of point addition condition (S3), for example, it is determined whether the point addition condition is satisfied by comparing the body position information of a target person with condition data. In the case of adding points (Yes), the procedure proceeds to S4. In the case of not adding points (No), the procedure returns to the entrance of the condition data$^n$ loop (S1).

(Weighting: S4)

In weighting (S4), for example, with respect to the score of the $n^{th}$ condition data, the score at X is weighted by the normal distribution as follows: 0 is 10%, 1 is 30%, 3 is 100%, 4 is 30%, and 5 is 10%. The score weighted is considered as a score candidate. Then, the procedure again returns to condition data$^n$ loop (S1).

(Assessment Immediately after Completion of Assessment Timing: S5)

In the assessment of assessment timing (S2), if all of five times of assessment timing are completed, since it is not assessment timing (No), the procedure proceeds to S5. Then, it is determined whether it is immediately after completion of assessment timing. If it is immediately after completion (Yes), the procedure proceeds to S6. If it is not immediately after completion (No), the procedure returns to S1.

(Addition of Score: S6)

In the addition of score (S6), the largest score candidate among five weighted score candidates is added as a score.

(Display of Grading Result)

The way of showing the grading result is not particularly limited. For example, the grading result may be shown by evaluation on a two-grade scale, namely, Good(G)/No Good (NG), or score or point evaluation on a three-or-more-grade scale. There is no particular limitation on the display screen of the grading result. For example, the grading result may be displayed on the display screen of a dance game, a karaoke device, and the like together with lyrics or choreography instruction image. Besides, the grading result may be displayed on a cellular phone, a smartphone, a personal computer (PC), and the like of a target person or a grader (dance instructor or the like).

Figure 7:
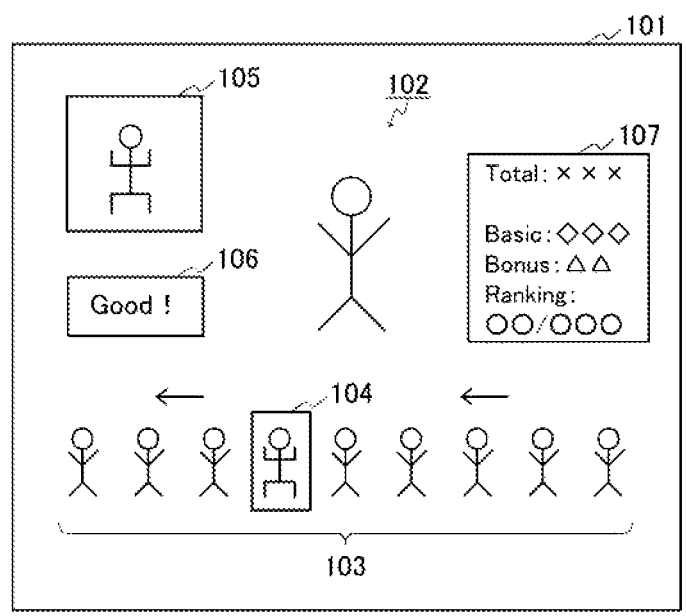
FIG. 7 is a diagram showing an example of the image display of the present invention.

FIG. 7 shows an example of the display screen in the case where the grading result is displayed on a dance grading device. Although the dance grading device of this example is provided with a karaoke function, the karaoke function is optional.

Main screen 101 shown in FIG. 7 includes model image 102, series of motion of choreography (series of motion) 103, assessment timing-showing display (square frame) 104, comprehensive grading result display 107, pinpoint grading result display 106, and target person image 105. In FIG. 7, choreography motion 103 flows from the right to the left on the screen.

The main screen 101 may display a background image (video) as in a conventional dance grading device or karaoke device, for example. The main screen preferably shows, for example, a promotional video (PV) of an artist, more preferably a PV of dance music. The model image 102 is not particularly limited, and may be an image of a singer, dancer, or the like, for example. This allows a target person to understand tacitly that the evaluation is made on the basis of the expressiveness of an actual singer, dancer, or the like.

As shown in FIG. 7, series of motion 103 of a model image is displayed on main screen 101. Here, the main screen shows the PV of the dance music in which the dancer who is model image 102 sings and dances. The target person sings and dances following the motion of the dancer. The target person is graded before and after the timing at which shown choreography motion 103 is on an assessment timing-showing display 104. The target person is graded with higher scores when his or her motion is in better assessment timing and satisfies the condition data. The comprehensive grading result display 107 may include a total score, a basic score, a bonus score, a ranking, and the like, for example. In order to display the ranking, the dance grading device of this example may have a function of updating the ranking through communication unit whenever necessary, for example. Also, as shown in pinpoint grading result display 106, the grading result ("Good" in FIG. 7) of each motion is displayed whenever necessary. The motion of the target person is displayed in real time on the main screen 101 as the target person image 105, and this allows the target person to check self-motion objectively. The dance grading device of this example preferably has a recording function.

Although the present invention has been described above with reference to a dance grading device as an example, the present invention is not limited thereto. For example, the present invention may be a karaoke device with a body motion (dance) grading function or games. Examples of the game include a dance game, a sports game, an acting game, and the like. In these games, the grading of body motion and the competition for scores bring about effects of making the games more entertaining and improving the level of the body motion.

While the present invention has been described above with reference to illustrative embodiments, the present invention is by no unit limited thereto. Various changes and modifications that may become apparent to those skilled in the art may be made in the configuration and specifics of the present invention without departing from the scope of the present invention.

This application is based upon and claims the benefit of priority from Japanese patent application No. 2013-077144, filed on Apr. 2, 2013, the disclosure of which is incorporated herein its entirety by reference.

EXPLANATION OF REFERENCE NUMERALS 1 body motion grading system
11 body position information acquisition unit
12 body part recognition unit
13 body motion grading unit
14 grading result display unit
15 condition data generation unit
101 main screen
102 model image
103 series of motion of choreography (series of motion)
104 assessment timing-showing display (square frame)
105 target person image
106 pinpoint grading result display
107 comprehensive grading result display
S: shoulder region
H: hip region

What is claimed is:

1. A body motion grading method for use in a dance grading device, a karaoke device, or a game comprising:
a body position information acquisition step configured to acquire, using cameras and sensors, digital information representing body position information of a target person subjected to grading in time series;
a body part recognition step configured to recognize a position of each part in the acquired body position information in time series and relatively recognize positions of body parts with reference to a certain body part, by:
determining a plurality of regions corresponding to the positions of the body parts within the digital information;
for each region, determining X, Y, and Z coordinates, the X, Y, and Z coordinates of the region within the digital information, the X, Y, and Z coordinates specifying the position of the body part to which the region corresponds;
for each region, determining a certainty of the X, Y, and Z coordinates of the region, as provided by the cameras and the sensors, the certainty classified as reliable or estimated;
a body motion grading step configured to conduct grading by comparing a position of a body part recognized by the body part recognition step with a preliminarily prepared comparison condition in time series, by:
for each region, comparing condition data indicating an angle connecting the body part to which the region corresponds and another body part with the preliminary prepared comparison condition; and
a grading result display step configured to display a grading result, wherein
the body position information acquisition step, the body part recognition step, and the body motion grading step are carried out by the dance grading device performing image analysis,
in the body motion grading step, dance choreography along with karaoke or game performance is graded,
in the body motion grading step, specific grading timing and grading timing before and after the specific grading timing are set for the grading by comparison in time series, score candidates are obtained by weighting plural graded scores at each of the specific grading timing and the grading timing before and after the specific grading timing, and
a score candidate is adopted from the plural score candidates as a score according to a predetermined criterion.

2. The body motion grading method according to claim 1, wherein a criterion for adopting a score candidate from the plural score candidates is to adopt the highest score candidate among the plural score candidates.

3. The body motion grading method according to claim 1, where in the body motion grading step,
the grading conducted by comparing a position of a body part recognized in the body part recognition step with a preliminarily prepared comparison condition in time series is grading conducted by comparing condition data showing a positional relationship between a part of a preliminarily prepared model and another part of the preliminarily prepared model with the position of the body part recognized in the body part recognition step, and
the condition data includes scores that will be given when conditions are satisfied.

4. The body motion grading method according to claim 3, further comprising:
a condition data generation step configured to generate the condition data, wherein
the condition data generation step comprises:
a specification step configured to specify plural target points of a body; and
a recording step configured to record a result obtained by comparison of a positional relationship between two points among the plural target points in association with a predetermined score as the condition data.

5. The body motion grading method of claim 1, wherein the score is output by a karaoke device to improve an entertainment value of the karaoke device, the score grading dance choreography of the target person who is using the karaoke device.

* * * * *